United States Patent [19]
Loper

[11] Patent Number: 5,628,804
[45] Date of Patent: May 13, 1997

[54] POLYETHER ESTERAMIDE CONTAINING ADDITIVES AND METHODS OF MAKING AND USING SAME

[75] Inventor: John T. Loper, Richmond, Va.

[73] Assignee: Ethyl Corporation, Richmond, Va.

[21] Appl. No.: 576,800

[22] Filed: Dec. 21, 1995

[51] Int. Cl.$^6$ ............................ C10L 1/22; C10M 149/12
[52] U.S. Cl. .................. 44/399; 44/400; 508/189; 508/195; 508/362; 508/367; 508/500; 560/155; 560/170
[58] Field of Search ............... 44/399, 400; 508/500; 560/155, 170

[56] References Cited

U.S. PATENT DOCUMENTS

| | | | |
|---|---|---|---|
| 3,144,311 | 8/1964 | Armstrong et al. | 44/340 |
| 3,146,203 | 8/1964 | Frew, Jr. et al. | 44/341 |
| 3,214,460 | 10/1965 | McGee | 508/500 |
| 3,306,856 | 2/1967 | Hu | 44/399 |
| 4,191,537 | 3/1980 | Lewis et al. | 44/387 |
| 4,210,425 | 7/1980 | Cummings | 44/399 |
| 4,234,321 | 11/1980 | Lilburn | 44/387 |
| 4,288,612 | 9/1981 | Lewis et al. | 560/159 |
| 4,305,833 | 12/1981 | Roberts | 508/500 |
| 4,600,409 | 7/1986 | Campbell | 44/387 |
| 4,695,291 | 9/1987 | Plavac | 44/387 |
| 4,758,247 | 7/1988 | Sung | 44/399 |
| 4,859,210 | 8/1989 | Franz et al. | 44/333 |
| 4,869,728 | 9/1989 | Sung | 44/419 |
| 4,881,945 | 11/1989 | Buckley, III | 44/387 |
| 4,944,770 | 7/1990 | Sung | 44/415 |
| 4,997,456 | 3/1991 | Malfer | 44/347 |
| 5,055,607 | 10/1991 | Buckley, III | 560/158 |
| 5,122,616 | 6/1992 | Malfer | 44/347 |
| 5,131,921 | 7/1992 | Sung et al. | 44/391 |
| 5,194,068 | 3/1993 | Mohr et al. | 44/391 |
| 5,197,997 | 3/1993 | Mozdzen et al. | 44/386 |
| 5,234,612 | 8/1993 | Carlisle | 44/391 |
| 5,286,267 | 2/1994 | Su et al. | 44/419 |
| 5,360,460 | 11/1994 | Mozdzen et al. | 44/386 |
| 5,387,266 | 2/1995 | Loper | 44/415 |
| 5,399,277 | 3/1995 | Patil | 44/426 |
| 5,454,962 | 10/1995 | Slama et al. | 252/51.5 A |
| 5,464,549 | 11/1995 | Sieberth | 252/51.5 A |
| 5,512,067 | 4/1996 | Loper | 44/415 |

OTHER PUBLICATIONS

Encyclopedia of Polymer Science and Technology; Plastics, Resins, Rubbers, Fibers; vol. 6; John Wiley & Sons, Inc.; pp. 108–112; 1967 (month N/A).

*Primary Examiner*—Ellen M. McAvoy
*Attorney, Agent, or Firm*—Dennis H. Rainear

[57] ABSTRACT

A polyether esteramide reaction product effective as a fuel additive for reducing intake valve deposits and octane requirement increase, as well as controlling combustion chamber deposits, in gasoline engines is disclosed together with fuel compositions and methods of making and using the same. The polyether esteramide reaction product contains two carbonyl groups. Preferably, the polyether esteramide contains an oxalyl group. Also disclosed are compositions and methods for dispersing deposits in lubricating oil products.

52 Claims, No Drawings

POLYETHER ESTERAMIDE CONTAINING ADDITIVES AND METHODS OF MAKING AND USING SAME

BACKGROUND OF THE INVENTION

1. Field of the Invention

The present invention relates to a novel class of compounds having utility as fuel additives, lubricant additives, fuel compositions, lubricant compositions and methods of making and using such additives. In particular, the present invention relates to multi-functional polyamine-containing additives effective at reducing intake valve deposits, combustion chamber deposits and octane requirement increase in gasoline engines, and methods of making and using the additive.

2. Background Discussion

Considerable effort has been expended to develop chemical products as detergents or "deposit control" additives for internal combustion engines. Oil-soluble detergent-dispersants for lubricating oil have been developed to control deposit and vanish formation, and to keep sludge and other solid matter, such as oxidized base oil, in suspension in the lubricating oil. Detergents, when added to hydrocarbon fuels employed in the engines, effectively reduce deposit formation which ordinarily occurs in carburetor ports, throttle bodies, venturies, intake ports and intake valves. The reduction of these deposit levels has resulted in increased engine efficiency and a reduction in the level of hydrocarbon and carbon monoxide emissions. However, with the advent of automobile engines that require the use of non-leaded gasolines (to prevent disablement of catalytic converters used to reduce emissions), it has been difficult to provide gasoline of high enough octane to prevent knocking and the concomitant damage which it causes. The difficulty is caused by octane requirement increase, herein called "ORI," which is due to deposits formed in the combustion chamber while the engine is operating on commercial gasoline.

Each engine, when new, requires a certain minimum octane fuel to operate satisfactorily without pinging and/or knocking. As the engine is operated on any gasoline, this minimum octane requirement increases. In most cases, if the engine is operated on the same fuel for a prolonged period it will reach equilibrium. This is apparently caused by an amount of deposits in the combustion chamber. Equilibrium is typically reached after 5000 to 15,000 miles of automobile operation.

ORI measured in particular engines with commercial gasolines will, at equilibrium, vary from 5 or 6 octane units to as high as 12 or 15 units, depending upon the gasoline compositions, engine design and type of operation. The seriousness of the problem is thus apparent. A typical current model year or older automobile with a research octane requirement of 85 when new may after a few months of operation require 97 research octane gasoline for proper operation, and little unleaded gasoline of that octane is available. The ORI problem exists in some degree with engines operated on leaded fuels. U.S. Pat. Nos. 3,144,311 and 3,146,203 disclose lead-containing fuel compositions having reduced ORI properties.

Many experts, believe the ORI problem, while present with leaded gasolines, is much more serious with unleaded fuel because of the different nature of the deposits formed with the respective fuels, the size of the increase, and because of the lesser availability of high-octane non-leaded fuels. This problem is compounded by the fact that the most common means of enhancing the octane of unleaded gasoline, increasing its aromatic content, also appears to increase the eventual octane requirement of the engine. Furthermore, some of the presently used nitrogen-containing deposit control additives with mineral oil or polymer carriers appear to contribute significantly to the ORI of engines operated on unleaded fuel.

Thus, it would be highly desirable to provide fuel compositions which contain deposit control additives which effectively control deposits in intake systems of engines, i.e., intake valve deposits (IVD), operated with fuels containing them, but do not contribute to the combustion chamber deposits (CCD) which can cause octane requirement increase (ORI).

Moreover, despite the great amount of work conducted in the field of dispersants for lubricating oils, a need exists for novel lubricating oil compositions which contain deposit control additives which effectively control deposits in lubricating systems of engines.

SUMMARY OF THE INVENTION

The invention is directed to a novel class of compounds having particular utility as additives for distillate fuel, so as to reduce IVD and ORI as well as control CCD.

The invention is also directed to a novel class of compounds having particular utility as dispersants for lubricating oil.

The invention is also directed to a method of operating an internal combustion engine with spark ignition in a manner to reduce IVD and ORI as well as control CCD.

This invention is also directed to a distillate fuel composition comprising at least one compound of the present invention.

The invention is also directed to a method of operating an internal combustion engine with spark ignition in a manner to reduce lubrication system deposits This invention is also directed to a lubricant composition comprising at least one compound of the present invention.

The invention is also directed to methods of making the compounds of the present invention.

In particular, the present invention provides a single agent effective at reducing IVD and ORI as well as controlling CCD in gasoline engines. The agent is a polyether esteramide reaction product synthesized by reaction of a polyamine, a di-carbonyl, preferably an oxalyl-containing compound, and a polyether. The agent may be employed in fuel compositions. Also disclosed are compositions and methods employing the agent for dispersing deposits in lubricating oil systems.

DETAILED DESCRIPTION OF THE PREFERRED EMBODIMENTS

The present invention is directed to a class of compounds of Formula I:

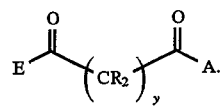

In Formula I, each R independently represents H or alkyl of 1 to 5 carbon atoms and y is an integer from 0 to 5. Preferably y is 0 such that the present invention includes a class of compounds of Formula I(a):

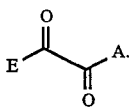

In Formulas I and I(a), E represents the oxyalkylene moiety of Formula II:

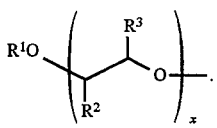

In Formula II, $R^1$ is a hydrocarbyl group selected from the group consisting of H, alkyl having from 1 to 18 carbon atoms, and alkylaryl of Formula III:

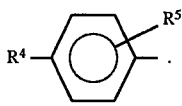

In Formula III wherein $R^4$ and $R^5$ are selected from the group consisting of H and $C_1$–$C_{60}$ alkyl, preferably H and $C_{1-30}$ alkyl, the alkyl may be linear or branched. Preferably, $R^1$ is alkyl having 10 to 15 carbon atoms; H; or arylalkyl of Formula III wherein $R^4$ and $R^5$ are selected from the group consisting of H and $C_1$–$C_{30}$ alkyl.

Hydrocarbyl is defined in connection with this specification and claims as a hydrocarbyl residue of an alcohol which is an organic radical, composed of carbon and hydrogen, which may be aliphatic, alicyclic, aromatic or combinations thereof, e.g., aralkyl. Typically, the hydrocarbyl $R^1$ is an alcohol which is substituted or unsubstituted. Also alkyl is defined in the present specification as including straight chain, i.e., linear, or branched chain alkyl unless specifically disclosed otherwise.

In Formula II, $R^2$ and $R^3$ are independently selected from the group consisting of H and alkyl, wherein $R^2$ and $R^3$ have a total of 0 to 10 carbon atoms, and x is an integer of from 5 to 30. $R^2$ and $R^3$ may be linear alkyl, branched alkyl, or may bond to each other to form a cycloaliphatic ring having 5 to 10 carbon atoms. Preferably, $R^2$ and $R^3$ are independently H, linear alkyl, or branched alkyl, wherein $R^2$ and $R^3$ have a total of 0 to 10 carbon atoms. Formula II encompasses homopolymeric moieties, e.g., polybutylene oxide, or copolymeric moieties, e.g., containing both butylene oxide and propylene oxide. In various preferred embodiments of the compounds of the present invention, $R^2$ and $R^3$ are H; $R^2$ and $R^3$ may be independently selected from the group consisting of H, $CH_3$ and $C_2H_5$; or $R^2$ is selected from the group consisting of H and $CH_3$ and $R^3$ is selected from the group consisting of H, $CH_3$ and $C_2H_5$. Preferably, x is an integer from 10 to 30.

The oxyalkylene moiety of Formula II is provided by employing an epoxide reactant of Formula II(a):

In Formula II(a), $R^2$ and $R^3$ are as defined above. The oxyalkylene moiety of Formula II may be formed by successively attaching epoxide moieties of Formula II(a) to a moiety of formula $R^1O$— (typically a residue from an alcohol $R^1OH$) by any known reaction mechanism as, for example described with regard to Step I(a) below.

The polyamine A of Formulas I and I(a) is a polyamine moiety which typically contains from 2 to 10 nitrogen atoms. The polyamine moiety A can have a structure which is aliphatic, cycloaliphatic, aromatic, heterocyclic, aliphatic and cycloaliphatic, aliphatic and aromatic, aliphatic and heterocyclic, cycloaliphatic and aromatic, cycloaliphatic and heterocyclic, or aromatic and heterocyclic. The polyamine moieties may be saturated or contain olefinic, acetylenic and/or aromatic unsaturation. Also, they may or may not contain other functional substituents, e.g., alkoxy substituents. The polyamine moieties are sterically unencumbered sufficiently to permit the below-described reaction. Furthermore, one skilled in the art, given the teachings herein, would select polyamine moieties of appropriate molecular weight for the particular use as a fuel or lubricant additive. Preferably, the polyamine moieties contain an average of up to 40 carbon atoms. The compounds of this invention can be formed from polyamine moieties having combinations of primary and secondary and/or tertiary amino groups. However, each polyamine moiety contains at least one primary or secondary amino group. Mixtures of suitable polyamines can be used, such as for example, commercial mixtures of straight chain, branched chain and cyclic ethylene polyamines having approximate overall compositions falling in the range corresponding to diethylene triamine to pentaethylene hexamine.

Particularly preferred polyamines include ethylene diamine (EDA); diethylene triamine (DETA); triethylene tetramine (TETA); alkyl etheramines, wherein the alkyl is $C_{1-30}$ hydrocarbon; amino ethyl ethanol amine (AEEA); dimethylaminopropylamine (DMAPA), i.e., $NH_2(CH_2)_3N(CH_3)_2$, or aminopropyl morpholine, i.e.,

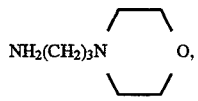

3,3'-iminobis(N,N-dimethylpropylamine) and aminoethyl piperarline (AEP), i.e.,

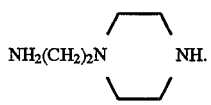

Suitable alkyl etheramines include those selected from the group consisting of $NH_2(CH_2)_3NH(CH_2)_3OR^9$, wherein $R^9$ is all alkyl having from 1 to 30 carbon atoms. Preferably, each alkyl etheramine is independently selected from the group consisting of $NH_2$—$(CH_2)_3$—$NH$—$(CH_2)_3$—$OC_{13}H_{27}$ and $NH_2$—$(CH_2)_3$—$NH$—$(CH_2)_3$—$OC_{10}H_{21}$.

Preferred compounds include a compound selected from the group consisting of:

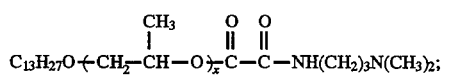

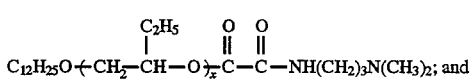

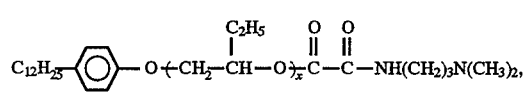

wherein x is as defined in Formula I.

For example, a preferred compound of the present invention has a Formula IV(a) or IV(b):

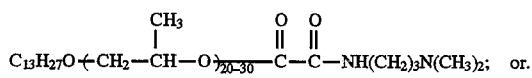  IV(a)

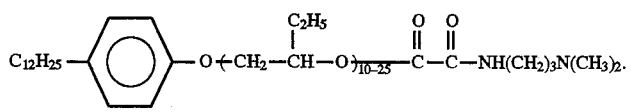  IV(b)

Method for Making the Compounds of the Present Invention

The compounds of the present invention as defined by Formula I above are made by any of the following new synthesis routes.

The polyether which may be employed in these synthesis routes may be made by reacting an alcohol, i.e., $R^1OH$, with epoxides to form an alkyl polyether or arylalkyl polyether, i.e., hydrocarbyl ether polyoxyalkylene intermediate, by Step I(a) as follows:

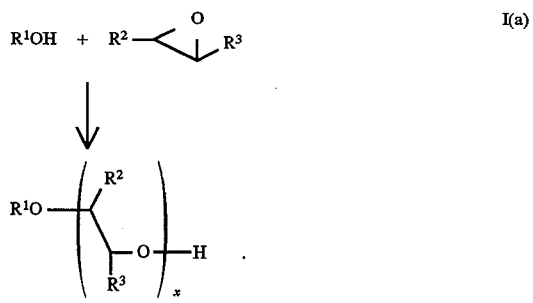

As shown above, the poly(oxyalkylene) alcohol chain is attached to the alcohol reactant, having the hydrocarbyl group $R^1$, by the addition of lower alkylene oxides, i.e., oxides, such as ethylene oxide, propylene oxide, the butylene oxides, or the pentylene oxides, to a hydroxy group of the alcohol reactant under polymerization conditions. General methods of production and properties of polyoxyalkylene polymers are disclosed in U.S. Pat. Nos. 2,841,479 and 2,782,240 and the "Encyclopedia of Polymer Science and Technology," Volume 6, pages 108–112 (1967) (Intersciences Publishers, division of John Wiley & Sons, Inc.) all of which are incorporated herein by reference. In the polymerization reaction, a single type of alkylene oxide may be employed, e.g., propylene oxide, in which case the product has homopolymer, e.g., poly(oxypropylene) alcohol, chains. However, copolymers are equally satisfactory and random copolymers are readily prepared by contacting the hydroxyl-containing compound with a mixture of alkylene oxides, such as a mixture of propylene oxide and butylene oxide. Block copolymers of oxyalkylene units also provide satisfactory poly(oxyalkylene) polymers for the practice of the present invention. Random polymers are more easily prepared when the reactivities of the oxides are relatively equal. In certain cases, when ethylene oxide is copolymerized with other oxides, the higher reaction rate of ethylene oxide makes the preparation of random copolymers difficult. In either case, block copolymers can be prepared. Block copolymers are prepared by reacting the hydroxyl-containing compound with one alkylene oxide, then the others in any order, or repetitively, under polymerization conditions. A particular block copolymer has polymer chains prepared by polymerizing propylene oxide on suitable monohydroxy chains to form poly(oxypropylene) alcohol chains and then polymerizing butylene oxide on the poly(oxypropylene) alcohol chains.

The poly(oxyalkylene) polymer chain-containing compounds produced are mixtures of compounds having different polymer chain lengths. However, their properties closely approximate those of the compound represented by the average composition and molecular weight.

A first method for synthesis of compounds of the present invention includes the steps of reacting a polyether, such as that prepared by above Step I(a), with at least one di-carbonyl-containing reactant, preferably oxalyl-containing reactant, to form an intermediate product, and reacting the intermediate product with a polyamine compound to form the compounds of the present invention. In this method the polyether has the Formula V:

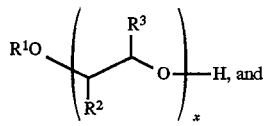  V and the polyamine compound has the Formula V(a):

$A—H$         V(a).

$R^1$, $R^2$, $R^3$, x and A are defined as in Formulas I and II above. The dicarbonyl-containing reactant has a Formula VI:

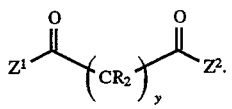  VI

In Formula VI, R and y are defined as in Formula I, and $Z^1$ and $Z^2$ are independently selected from the group consisting of OH, Cl, Br and $OR^6$, wherein $R^6$ is alkyl having from 1 to 5, preferably 2, carbon atoms. Preferably, the di-carbonyl-containing reactant is an oxalyl-containing reactant selected from the group consisting of oxalic acid, diethyl oxalate, and oxalyl dichloride.

The above method can be categorized into (i) methods which make a diesterpolyether as the intermediate product, and (ii) methods which make a mono-esterpolyether as the intermediate product. The methods which make the dipolyether oxalate as the intermediate product will also make a polyether alcohol, simultaneously with conversion of the diesterpolyether to the polyether amide of the present invention, as explained below. In contrast, those methods which make the mono-esterpolyether do not necessarily generate a polyether alcohol when the mono-esterpolyether is reacted with the polyamine to form the polyether ester amide of the present invention, as explained below.

The new synthesis routes are illustrated below for making the compounds of Formula I wherein y is 0, i.e., compounds of Formula I(a). However, it is understood that the new synthesis routes may also be employed to make the compounds of the present invention as defined by Formula I wherein y is an integer from 1 to 10.

Method To Make Diester Intermediate

One of the methods which makes the diester intermediate product, for subsequent conversion to polyether esteramide products of the present invention, includes mixing at least about 2, preferably about 2 to about 10, most preferably about 2, equivalents of polyether with 1 equivalent of di-carbonyl-containing reactant, preferably oxalyl-containing reactant. Typically the mixing occurs in the presence of toluene, xylene, dichloromethane or other organic solvent. For the purposes of this specification, equivalents are defined as molar equivalents and in a given reaction, they are measured relative to a mole of product. Thus, for example, two moles of polyether react with one mole of oxalic acid to form one mole of diester oxalate. Thus, this reaction employs two equivalents of polyether and one equivalent of oxalic acid to make one equivalent of diester oxalate.

The reaction is as follows in Step VII(a):

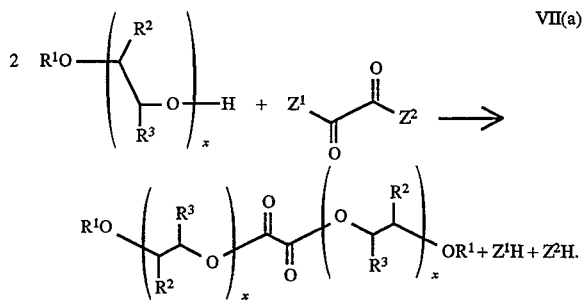

In the reaction of Step VII(a), $Z^1$ and $Z^2$ are defined as disclosed above. Optionally, the above reactants are mixed in the presence of 0.1 to 0.01 equivalents of an acidic catalyst such as paratoluene sulfonic acid, sulfuric acid, or a solid acid catalyst, e.g., AMBERLYST 15, a highly acidic ion exchange resin of high surface area polymer impregnated with positive charge, manufactured by Rohm and Haas Co., Philadelphia, Pa. Typically, solid catalyst is filtered out after use. Preferably, the mixture is reacted at the reflux temperature of the solvent employed. Such temperature ranges from about 100° to about 160° C., e.g., 110° C. when a toluene solvent is employed. The mixture is maintained at the reflux temperature for about 4 to about 6 hours, in the absence of acid catalyst, or about 1 to about 4 hours, in the presence of acid catalyst.

It is preferred to dissolve the reactants in the inert organic solvent and to employ the catalyst to speed up the reaction. Para-toluene sulfonic acid is a preferred catalyst for promoting the above reaction. On completion of the preparation of the reaction product, the reaction mixture is cooled and the solvent as well as trace amounts of by-products, such as HCl and water (if any) not previously removed, are removed under reduced pressure.

Reacting Diester Intermediate to Make Polyether Ester Amide

To produce compounds of Formula I which have polyether on one side and polyamine on the other side, at least about 1, preferably about 1 to about 10, equivalents, of the diester product of Step VII(a), is mixed with 1 equivalent of a polyamine of above-listed Formula V(a) as follows in Step VII(b):

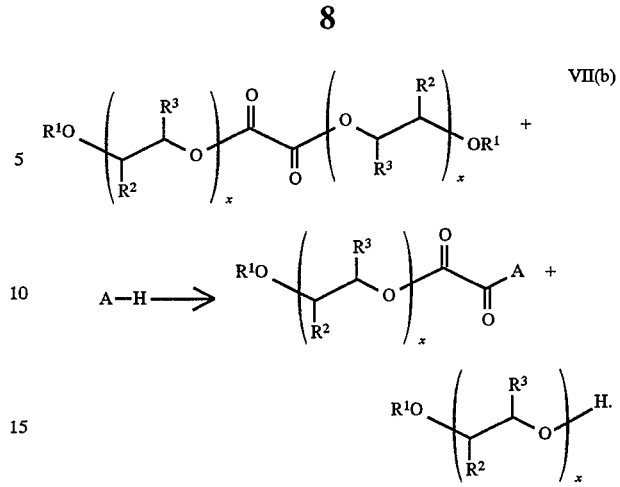

The reaction of Step VII(b) produces polyether ester amide (the dispersant of the present invention) and polyether alcohol. Potentially, a minor side product of these reactions could be a symmetrical diamide. It is noted that the present invention may also be employed with a variety of carrier fluids such as polyether alcohols (other than that produced by the reaction), paraffinic mineral oils, or naphthenic mineral oils. The reaction of Step VII(b) may be conducted at a temperature of about 0° to about 160° C. in the presence or absence of organic solvent. Typically, the reaction is conducted at a temperature of 0° to 160° C. Preferably, the reaction is conducted at a temperature of 0° to 10° C. with or without solvent, or at about 100° to about 160° C. while refluxing the solvent.

In the above method, preferably $Z^1$ and $Z^2$ of Step VII(a) are OH, thus the oxalyl-containing reactant is oxalic acid. Alternatively, Step VII(a) may preferably be performed by employing diethyl oxylate as the oxalyl-containing reactant. The method employing diethyl oxalate is the same as that employing oxalic acid except, unlike the reaction with oxalic acid, there is no need to remove an azeotrope stream of water formed during reaction because water does not form. In another alternative, the method of Step VII(a) may preferably employ oxalyl-chloride rather than oxalic acid. In this method, employing oxalyl dichloride, no catalyst is employed. However, preferably the method includes adding solvent and heating the reactants under a nitrogen atmosphere. The above methods employing oxalic acid or diethyl oxylate are only optionally performed under a nitrogen atmosphere.

Methods to Make Monoesterpolyether Intermediate

As mentioned above, the method of making the present compounds may be performed to make a monopolyether-ester intermediate. In this method at least about 1, preferably about 1 to about 5, equivalents, most preferably about 1 equivalent, of polyether are reacted with 1 equivalent of a di-carbonyl-containing, preferably oxalyl-containing, moiety at a reaction temperature of about 0° to about 10° C. in an organic solvent. If one equivalent of polyether is reacted with one equivalent of the oxalyl-containing moiety, then higher reaction temperatures (about 100° to about 160° F.) may be employed. The reaction proceeds as follows in Step VIII(a):

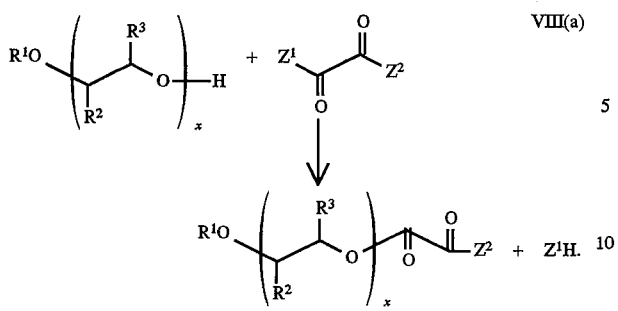

Next, the monoester intermediate is reacted with polyamine to produce the compounds of the present invention as follows in Step VIII(b):

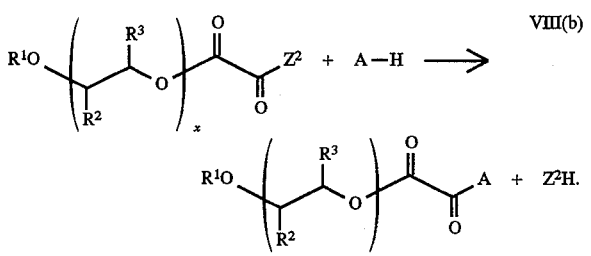

If the polyamine is mixed with excess equivalents of monoester intermediate, then the difference in equivalents should be compensated by employing sufficient equivalents of polyether such that the total of equivalents of polyether and polyamine at least equals the equivalents of monoester intermediate. The reaction of the monoester intermediate and polyether alcohol results in making a diester.

Where the oxalyl-containing moiety is oxalyl dichloride, the reaction of Steps VIII(a) and VIII(b) produces HCl. The generated HCl may be removed either by a nitrogen gas purge continuously during its production or by treating the product, after its production, with 10% basic aqueous extraction or ion exchange resins in column chromatography. Preferably, the presence of water is minimized where oxalyl dichloride is employed.

The above method of VIII(a) and VIII(b) may be performed by employing ethyl oxalyl chloride in place of oxalyl dichloride. Thus, at least about 1, preferably about 1 to about 5, equivalents of polyether is employed with 1 equivalent of ethyl oxalyl chloride at a temperature of about 0° C. to about 160° C. with or without solvent. Preferably, the reaction is preformed at about 0° C. to about 10° C., without reflux, or at refluxing temperatures of about 100° to about 160° C. where an equimolar ratio of these reactants is employed. In this method, ethyl oxalyl chloride and polyether are reacted in the presence of an organic solvent, and in the absence of acid catalyst, to form a compound of Formula IX:

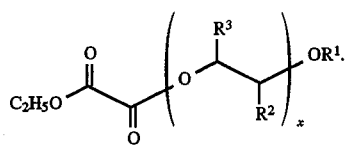

The compound of Formula IX is then reacted with polyamine compound of Formula V(a):

A—H    V(a), at a temperature of about 110° C. to about 160° C., and in the presence of a basic catalyst, to form the polyether ester amide.

Methods to Make and Further React a Polyamine Di-carbonyl Intermediate

As an alternative to the above methods, the compounds of Formula I of the present invention can also be made by reacting the di-carbonyl-containing, preferably oxalyl-containing, reactant with the polyamine to produce a polyamine di-carbonyl intermediate. Then the polyamine di-carbonyl intermediate is reacted with the polyether to produce the compounds of the present invention. This method will be illustrated below for making compounds of Formula I(a). However, it is applicable to make any of the compounds of Formula I above.

In this method, for example, 1 equivalent of polyamine is mixed with at least about 1, preferably about 1 to about 5, equivalents, of dialkyloxalate, e.g., diethyloxalate at about 0° to about 160° C. in the presence of organic solvent as follows in Step X:

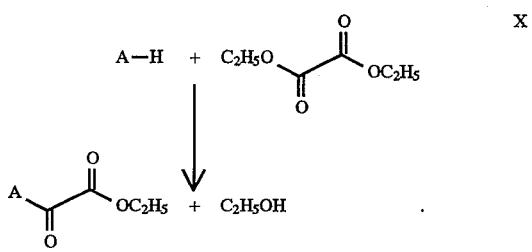

Then one equivalent of the polyamine oxalate is reacted with one equivalent of polyether alcohol as follows in the presence of a basic catalyst, such as $NaOC_2H_5$, and solvent at a temperature of about 100° to about 160° C. as follows in Step XI:

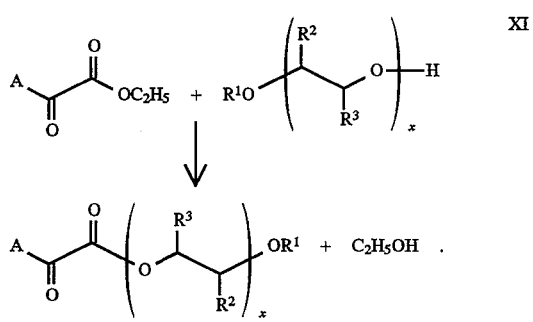

Depending on the particular application of the composition of this invention, the reaction may be carded out in the medium in which it may ultimately find use, e.g. polyether carriers or an oleophilic organic solvent or mixtures thereof and be formed at concentrations which provide a concentrate of a detergent composition. Thus, the final mixture may be in a form to be used directly for blending in fuel or lubricating oil compositions.

Measuring IVD, CCD and ORI

The effectiveness of a composition on IVD, CCD and ORI may be measured by a variety of procedures. Typical procedures are as follows.

IVD can be measured by employing a standard engine test procedure involving operating an engine for a given test period on a given test fuel. The engine at the start of the test would have a clean intake valve and upon completion of the test, the weight of the intake valve deposits is determined. The lower the weight of deposits, the more effective the composition.

CCD can be measured by employing a standard engine test procedure, involving operating an engine for a given test period on a given test fuel. The test would start with a clean combustion chamber and upon completion, the weight of the combustion chamber deposits is determined. The lower the weight of the deposits, the more effective the composition.

ORI can be measured by employing a standard engine test procedure, involving operating an engine for a given test period on a given test fuel. At the end of the test period, the engine is run with gasolines having varying levels of octane to determine when engine knock occurs. Knock can be detected by listening to the engine.

It is desirable that CCD is controlled, i.e., does not increase significantly, while IVD and ORI are decreased.

The present invention is further illustrated by the following non-limiting examples.

EXAMPLE 1

Step A—Preparation of Alkylpoly(oxyalkylene) Diester

To a 2-Liter three neck round bottom flask equipped with a mechanical stirrer, an addition funnel, and a condenser, was added 25 g (0.197 mol) oxalyl chloride, 690 g (0.394 mol) tridecyl polypropylene glycol (molecular weight 1750), and 300 grams toluene. The 690 g of polyether was dissolved in 250 g toluene under nitrogen and with stirring to form a mixture. The oxalyl chloride was transferred into an addition funnel containing 50 mL of toluene to form a solution. This solution was added dropwise to the polyether-toluene mixture. During this addition, nitrogen gas was bubbled through the polyether-toluene mixture and the off gas from the mixture was bubbled through a sodium hydroxide solution to trap any generated HCl. Upon completing addition of the solution, the resulting mixture was further stirred and heated at reflux temperature (about 110° C.) for about one hour. FT-IR spectroscopy indicated the presence of diester. The product was used in Step B without further purification as follows.

Step B—Preparation of Tridecyl Poly(oxypropylene) Dimethylaminopropylamine Ester Amide To a 2-Liter three neck round bottom flask equipped with an addition funnel, a condenser and a mechanical stirrer, and containing about 1000 g of a tridecylpoly(oxypropylene) diester-toluene solution (prepared according to Step A), was added 20.1 g (0.197 mol) N-N'dimethyl-1,3-propanediamine (also known as 3-dimethylaminopropylamine). The mixture was then heated at reflux for two hours and then solvent was removed under vacuum to give the above identified product as a yellow liquid.

EXAMPLE 2

Step A—preparation of Alkylpoly(oxalkylene) Diester

To a 2-Liter three neck round bottom flask equipped with a mechanical stirrer, an addition funnel and, a condenser was added 291.0 g (0.43 mol) dodecyl polybutylene glycol (molecular weight 678), 107 mL (0.214 mol), oxalyl chloride (2.0 molar solution in $CH_2Cl_2$), and 400 grams toluene. The polyether was dissolved in the toluene under nitrogen and with stirring to form a mixture. Then a solution of oxalyl chloride in methylene dichloride was added dropwise via an addition funnel. Upon completing addition of the oxalyl chloride solution, the resulting mixture was further stirred and heated at reflux temperature (about 110° C.) for two hours. FT-IR spectroscopy indicated the presence of diester. The product was used in Step B without further purification as follows.

Step B—Preparation of Dodecyl Poly(oxybutylene) Dimethylaminopropylamine Ester Amide To a 2-Liter three neck round bottom flask equipped with an addition funnel, a condenser and a mechanical stirrer, and containing about 700 g of a dodecylpoly(oxybutylene) diester-toluene solution (prepared according to Step A), was added 21.9 g (0.214 mol) dimethylaminopropylamine. The mixture was then heated at reflux (110° C.) for two hours and then solvent was removed under vacuum to give the above identified product as a yellow liquid.

EXAMPLE 3

Step A—preparation of Alkylpoly(oxyalkylene) Diester

Employing the procedure of the above Examples, 278.6 g (0.428 mol) dodecyl poly-1,2-butlyene oxide (MW 651) was combined with 107 mL (0.214 mol), oxalyl chloride (2.0 molar solution in $CH_2Cl_2$), and 400 grams toluene as follows. The dodecyl poly-1,2-butlyene oxide was dissolved in the toluene under a nitrogen atmosphere. Then oxalyl chloridedichloromethane solution was added dropwise via an addition funnel to the polyether/toluene solution with stirring. Upon completing addition of the oxalyl chloride solution, the resulting mixture was further stirred and heated at reflux two hours. FT-IR spectroscopy indicated the presence of diester. The product was used in Step B without further purification as follows.

Step B—Preparation of Dodecyl Poly(oxybutylene) Dimethylaminopropylamine Ester Amide To a 2-Liter three neck round bottom flask equipped with an addition funnel, a condenser and a mechanical stirrer, and containing about 777 of a dodecyl poly-1,2-oxybutylene diester-toluene solution (prepared according to Step A), was added dropwise 21.9 g (0.214 mol) dimethylaminopropylamine with stirring. The mixture was then heated at reflux (110° C.) for two hours and then solvent was removed under vacuum to give the above identified product as a yellow liquid.

EXAMPLE 4

Step A—Preparation of Dodecylphenylpoly (oxylalkylene) Diester

Employing the procedure of the above Examples, 343.2 g (0.24 mol) dodecylphenylpolybutylene glycol (mw 1430), 60 mL (0.12 mol) oxalyl chloride (2.0M solution in $CH_2Cl_2$), and 400 g toluene were combined as follows. The polyether was dissolved in the 400 g of toluene and stirred as the oxalyl chloride solution was added at room temperature under a nitrogen atmosphere. HCl as evolved during this addition, was removed and trapped in a sodium hydroxide solution. After addition of the oxalyl chloride solution was complete, the resulting mixture was stirred at reflux temperature (110° C.) for 2 hours under nitrogen. FT-IR indicated the presence of diester. The product was used in Step B without further purification as follows.

Step B—Preparation of Dodecylphenyl Poly (oxybutylene) Dimethylaminopropylamine Ester Amide To a 2-Liter three neck round bottom flask equipped with an addition funnel, a condenser and a mechanical stirrer, and containing about 750 g of a dodecylphenyl polyoxybutylene diester-toluene solution (prepared according to Step A), was added dropwise 15 mL (0.12 mol) dimethylaminopropylamine with stirring. After addition was complete, the resulting mixture was then heated at reflux (110° C.) for two hours and then solvent was removed under vacuum to give the above identified product as a yellow liquid.

EXAMPLE 5

Step A—Preparation of Alkylpoly(oxyalkylene) Monoester

To a 2-Liter three neck round bottom flask equipped with a mechanical stirrer, an addition funnel, and a condenser was added 210 g (0.12 mol) tridecyl polypropylene glycol (MW 1750), and 250 grams toluene. The solution was cooled to 0° C. in an ice bath. To the cooled solution, 60 mL (0.12 mol) oxalyl chloride (2.0M solution in dichloromethane) was added dropwise. Addition with stirring occurred over one hour and upon completion of addition, the mixture was stirred for another hour at 0° C. FT-IR spectroscopy indicated the presence of ester acid chloride. The product was used in Step B without further purification as follows.

Step B—Preparation of Tridecyl Poly(oxypropylene) Dimethylaminopropylamine Ester Amide A 2-Liter three neck round bottom flask equipped with an addition funnel, a condenser and a mechanical stirrer containing about 475 g of a tridecylpoly(oxypropylene) monoester-toluene solution (prepared according to Step A) was cooled to 0° C. in an ice bath. Then, 15 mL (0.12 mol) dimethylaminopropylamine was added dropwise with stirring. The mixture was stirred for an additional two hours. The reaction mixture was allowed to come to room temperature over the next two hours. Upon reaching room temperature, the reaction mixture was extracted with a 10% sodium hydroxide solution, washed with brine and the resulting organic layer was dried over magnesium sulfate and concentrated under reduced pressure to give the above identified product as a yellow liquid.

EXAMPLE 6

Step A—Preparation of Dodecylphenylpolyoxybutylene Monoester

To a 1-Liter three neck round bottom flask equipped with a mechanical stirrer, an addition funnel, and a condenser was added 90.2 g (0.063 mol) dodecylphenylpolybutylene glycol (MW 1430), and 150 mL dichloromethane. The solution was cooled to 0° C. in an ice bath. To the cooled solution, 31.5 mL (0.063 mol) oxalyl chloride (2.0M solution in dichloromethane) was added dropwise via an addition funnel under nitrogen. Addition with stirring occurred over one hour and upon completion of addition, the mixture was stirred for another hour at 0° C. FT-IR spectroscopy indicated the presence of ester acid chloride. The product was used in Step B without further purification as follows.

Step B—Preparation of Dodecylphenylpolyoxybutylene Dimethylaminopropylamine Ester Amide A 1-Liter three neck round bottom flask equipped with an addition funnel, a condenser and a mechanical stirrer, and containing about 475 g of a dodecylphenylpoly (oxybutylene) monoester-toluene solution (prepared according to Step A), was cooled to 0° C. in an ice bath. Then, 7.9 mL (0.063 mol) dimethylaminopropylamine was added dropwise via the addition funnel under nitrogen with stirring. The mixture was stirred for an additional two hours while the ice bath was removed. Thus, the reaction mixture was allowed to come to room temperature over two hours. Upon reaching room temperature, the reaction mixture was extracted with a 10% sodium hydroxide solution, washed with brine and concentrated under reduced pressure to give the above identified product as a yellow liquid.

EXAMPLE 7—Engine Tests to Compare Fuels Containing the Present Additive with Other Additives The effectiveness of the compounds of this invention as detergents for fuels was demonstrated by comparative engine tests. These tests involved use of a standard engine test procedure for determining the amount of intake valve deposits formed when operating the engine for a test period of 100 hours on the test fuel. The base fuel used in these tests was an additive-free gasoline. Each test started with a clean intake valve and combustion chambers and upon completion of the 100-hour test, the weight of the intake valve deposits was determined. Therefore, the lower the weight of deposits, the more effective the composition. A number of different additives were subjected to the foregoing test. The results from tests performed with a first engine are listed in Table I. The results from tests performed with a second engine are listed in Table II. "Inventive Fuels A and B" of Tables I and II, respectively, were made by mixing the products of the present invention from Examples 1 and 4, respectively, with an equal amount of inert stable olephyllic organic solvent boiling in the range of about 100° to 400° F., and then adding this mixture to the gasoline base fuel. The products produced according to the method of Examples 1 and 4 are present in the gasoline at levels of 125 lbs. per thousand barrels (PTB) of gasoline. Comparative Fuels A, B and C were prepared from the base fuel mixed with 125 lbs. OGA-480 fuel additive manufactured by Chevron Oil Co., San Francisco, Calif., per thousand barrels of gasoline. The fuels were tested by use in a four cylinder 2.3 liter engine. The IVD and CCD results listed in Tables I and II are averages of the four engine cylinders for each test.

TABLE I

| Fuel Sample | Additive Level (PTB) | IVD Deposits (mg.) | CCD Deposits (mg.) |
| --- | --- | --- | --- |
| Inventive Fuel A | 125 | 120 | 1452 |
| Comparative Fuel A | 125 | 92 | 1533 |
| Comparative Fuel B | 125 | 99 | 1555 |

TABLE II

| Fuel Sample | Additive Level (PTB) | IVD Deposits (mg.) | CCD Deposits (mg.) |
| --- | --- | --- | --- |
| Inventive Fuel B | 125 | 108 | 1240 |
| Comparative Fuel C | 125 | 156 | 1620 |

The results show the Inventive Fuels as achieving comparable or reduced levels of IVD and CCD as compared or reduced levels of IVD and CCD as compared to potentially competing Fuels A, B and C. These IVD and CCD levels should enhance engine performance. For example, reduction of IVD is important to increasing engine efficiency and reducing the level of hydrocarbon and carbon monoxide emissions from an engine.

Uses for Compounds of the Present Invention

The compounds produced in accordance with this invention are useful as fuel and lubricating oil additives. Thus, among the embodiments of this invention are fuel and lubricant compositions containing minor detergent/dispersant amounts of at least compound of the present invention. Also provided by this invention are additive concentrates (including "additive packages" or "ad-packs") containing from 0.1 to 99.9% by weight of at least one oil-soluble dispersant and a minor proportion of at least one inert diluent, e.g., solvent, or carrier fluid, typically a mineral oil, a poly-alpha-olefin oligomer, a polyoxyalkylene glycol, a carboxylic acid ester, etc., of suitable viscosity.

The fuels can be any distillate fuel such as gasoline (including so-called reformulated gasolines which may or may not contain oxygenates such as alcohols and/or ethers), diesel fuels, kerosenes, jet fuels, burner fuels, home heating oils, gas oils, and the like. It is preferred to employ the compounds of the present invention with gasoline. When the compounds of this invention are used in normally liquid petroleum fuels, such as middle distillates boiling in the range of from about 150° to 800° F. including gasoline, kerosene, diesel fuels, home heating fuel oil, jet fuels, cycle oils, etc., a concentration of the compound in the fuel in the range of typically from 1 ppm to 2 weight %, preferably 0.005 weight % to 0.5 weight %, based on the total weight of the fuel, will usually be employed. However, these levels are not limitations of the present invention. Departures from these ranges can be resorted to whenever deemed desirable or necessary under particular circumstances.

Lubricants

The lubricating oils, in which compounds of the present invention may be employed, can be any animal, vegetable or mineral oil, for example petroleum oil to SAE 30, 40, or 50 lubricating oil grades, castor oil, fish oils or oxidized mineral oils. Alternatively the lubricating oil can be a synthetic ester lubricating oil. These esters include diesters such as di-octyl adipate, di-octyl sebacate, di-decyl glutarate and mixtures thereof. Alternatively, the synthetic ester can be a polyester such as that prepared by reacting polyhydric alcohols, such as trimethylolpropane and pentaerythritol, with monocarboxylic acids, such as butyric acid, to give the corresponding tri- and tetra-esters. Also, complex esters may be used, such as those formed by esterification reactions between carboxylic acid, a glycol and an alcohol, or monocarboxylic acid.

Thus, base oils suitable for use in preparing the lubricant compositions of this invention include those conventionally employed as crankcase lubricating oils for spark-ignition engines and compression-ignition engines, such as automobile and truck engines, marine and railroad diesel engines, and the like. Advantageous results are also achieved by employing the additives of this invention in base oils conventionally employed in and/or adapted for use as power transmitting fluids such as automatic transmission fluids, tractor fluids, universal tractor fluids, hydraulic fluids, power sterring fluids, and the like. Gear lubricants, industrial oils, pump oils and other lubricating oil compositions can also benefit from the incorporation therein of the additives of this invention.

The compounds of this invention are oil-soluble, dissolvable in the oil sometimes with the aid of a suitable solvent, diluent, or compatibilizing agent, or they are capable of being dispersed in the oil to form a stable dispersion. Oil-soluble, dissolvable, or dispersible as that terminology is used herein does not necessarily indicate that the materials are soluble, dissolvable, miscible, or capable of being suspended in oil in all proportions. Rather, it means that the compounds are soluble or stably dispersible in oil to an extend sufficient to exert their intended effect in the environment in which the oil is employed. Moreover, the additional incorporation of other additives may also permit incorporation of higher levels of a particular compound of this invention, if desired.

Accordingly, while any effective dispersant amount of these compounds can be incorporated into the fully formulated lubricating oil composition, typically the lubricant composition will contain from about 0.01 to about 10, preferably from about 0.1 to about 8, and most preferably from about 0.25 to about 5 weight % of the compound of this invention based on the total weight of the lubricating oil composition.

The compounds can be incorporated into the base oil in any convenient way. Thus, they can be added directly to the oil by dispersing or dissolving the compound in the oil at the desired level of concentration, typically with the aid of a suitable solvent such as toluene, xylene, cyclohexane, tetrahydrofuran, and/or light mineral oil. Such blending can occur at room temperature or at suitable elevated temperatures.

The lubricants may further include conventional lubricant additives such as metal-containing detergents, antiwear agents, extreme pressure agents, corrosion inhibitors, foam inhibitors, friction modifiers, viscosity index improvers, pour point depressants, oxidation inhibitors, and the like. These additives include low-base and overbased alkali and/or alkaline earth metal detergents, such as the sulfonates, sulfurized phenates and salicylates of lithium, sodium, potassium, calcium and/or magnesium; antiwear and/or extreme pressure agents such as metal salts of dihydrocarbyl dithiophosphoric acids (e.g., zinc, copper or molybdenum dialkyldithiophosphates); oxidation inhibitors such as hindered phenolic antioxidants, aromatic amine antioxidants, and copper-containing antioxidants; supplementary dispersants such as succinimide dispersants, succinic ester-amide dispersants, and Mannich base dispersants; friction reducing and/or fuel economy improving additives such as glycerol monooleate, pentaerythritol monooleate, long chain acid esters of glycols, sulfurized olefins, sulfurized unsaturated fatty acids and sulfurized unsaturated fatty acid esters; rust and corrosion inhibitors; foam inhibitors; viscosity index improvers; polymeric dispersant-viscosity index improvers; demulsifying agents; and the like. such additives can be employed in the base oil at their customary use concentrations, which are known to those skilled in the art and reported in numerous patent disclosures. For further details concerning such additives, one may refer for example to U.S. Pat. Nos. 4,644,822; 4,908,145; 5,080,815 and 5,137,980, the entire disclosure of each of which is incorporated herein by reference. In the practice of this invention any crankcase lubricant containing any combination of any additives can be used, subject only to the provisos that (i) the lubricant contains a dispersant amount of the dispersant and/or the borated (or otherwise modified) dispersant, and (ii) the makeup of the overall lubricant is such that no component(s) thereof unduly interfere(s) with the dispersant effectiveness of the dispersant and/or the borated (or otherwise modified) dispersant used therein. Borated and otherwise modified dispersants of the present invention are discussed below.

Further aspects of this invention reside in the formation of metal complexes and other post-treated derivatives, e.g., boronated derivatives, of the novel compounds prepared in accordance with this invention. Suitable metal complexes may be formed in accordance with known techniques of employing a reactive metal ion species during or after the formation of the dispersants of this invention. Complexforming metal reactants include the nitrates, thiocyanates, halides, carboxylates, phosphates, thiophosphates, sulfates, and borates of transition metals such as iron, cobalt, nickel, copper, chromium, manganese, molybdenum, tungsten, ruthenium, palladium, platinum, cadmium, lead, silver, mercury, antimony, etc. Disclosures relating to these complexing reactions may be found in U.S. Pat. Nos. 5,464,549, 3,306,908 and Re. 26,443 all of which are incorporated herein by reference.

Preferred post-treatment compositions of this invention include those formed by reacting the dispersants of this invention with one or more post-treating agents, preferably (a) one or more boronating agents, preferably a boron acid (especially boric acid or metaboric acid), a boron oxide, a boron ester, or a boron salt (especially an ammonium borate); (b) one or more phosphorylating agents, preferably an inorganic acid of phosphorus (especially phosphorous acid, $H_3PO_3$), or an anhydride thereof, or any partial or complete sulfur analog thereof; (c) one or more acylating agents, preferably maleic anhydride, fumaric acid, maleic acid, maleic acid, glutaric acid, glutaric anhydride, succinic acid, $C_{1-30}$ alkylsuccinic acids or anhydrides, adipic acid, etc.; or (d) mixtures of any two of (a), (b) and (c), or of all three of (a), (13) and (c).

To prepare borated dispersant, dispersant of the present invention is heated in combination with a suitable boron-containing material such that the resultant product contains up to about 1% by weight of boron. Temperatures in the range of about 140° to about 200° C. are generally satisfactory for use in the boration reaction. Suitable methods for conducting boration are well known to those skilled in the art, as disclosed by U.S. Pat. Nos. 3,087,936; 3,254,025; 3,322,670; 3,344,069; 4,080,303; 4,426,305; 4,925,983, 5,114,602 and 5,454,962, the entire disclosure of each of which is incorporated herein by references.

This invention is susceptible to considerable variation in its practice. Accordingly, this invention is not intended to be limited by the specific exemplifications set forth hereinabove. Rather, this invention is intended to cover the subject matter within the spirit and scope of the appended claims and the permissible equivalents thereof.

What is claimed is:

1. A compound of a Formula I:

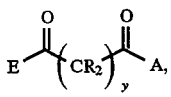

wherein each R is independently selected from the group consisting of H and an alkyl having from 1 to 5 carbon atoms, y is an integer from 0 to 5, and E represents a moiety of a Formula II:

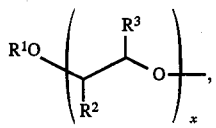

wherein $R^2$ and $R^3$ are independently selected from at least one member of the group consisting of H and alkyl, wherein $R^2$ and $R^3$ have a total of 0 to 10 carbon atoms, wherein optionally, $R^2$ and $R^3$ are bonded to each other to form a cycloaliphatic ring of 5 to 10 carbon atoms, x is an integer from 5 to 30, and $R^1$ is selected from the group consisting of H, alkyl having from 1 to 18 carbon atoms, and alkylaryl of Formula III:

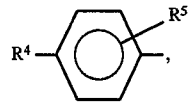

wherein $R^4$ and $R^5$ are selected from the group consisting of H and $C_1$–$C_{60}$ alkyl, and A is a polyamine moiety having from 2 to 10 nitrogen atoms, wherein the polyamine moiety comprises at least one member of the group consisting of a primary amino group and a secondary amino group.

2. The compound of claim 1, wherein $R^2$ and $R^3$ may be the same or different, and each independently represents a member of the group consisting of H, $CH_3$ and $C_2H_5$.

3. The compound of claim 2, wherein $R^2$ is selected from the group consisting of H and $CH_3$.

4. The compound of claim 3, wherein $R^2$ and $R^3$ are H.

5. The compound of claim 1, wherein y is 0 and $R^2$ and $R^3$ are independently selected from at least one member of the group consisting of H, linear alkyl and branched alkyl, wherein $R^2$ and $R^3$ have a total of 0 to 10 carbon atoms.

6. The compound of claim 1, wherein $R^1$ is H.

7. The compound of claim 1, wherein $R^1$ is alkyl having 10 to 15 carbon atoms.

8. The compound of claim 1, wherein $R^1$ is arylalkyl of Formula III, wherein $R^4$ and $R^5$ are selected from the group consisting of H and $C_1$–$C_{30}$ alkyl.

9. The compound of claim 1, wherein A is a polyamine moiety selected from the group consisting of aliphatic polyamine, cycloaliphatic polyamine, aromatic polyamine, heterocyclic polyamine, aliphatic and cycloaliphatic polyamine, aliphatic and aromatic polyamine, aliphatic and heterocyclic polyamine, cycloaliphatic and aromatic polyamine, cycloaliphatic and heterocyclic polyamine, and aromatic and heterocyclic polyamine; wherein each polyamine is independently a member selected from the group consisting of saturated polyamine and unsaturated polyamine, wherein the unsaturation is selected from the group consisting of olefinic unsaturation, acetylenic unsaturation, aromatic unsaturation, and combinations of such unsaturation.

10. The compound of claim 1, wherein A is a polyamine moiety selected from the group consisting of ethylene diamine, diethylene triamine, triethylene tetramine, alkyl etheramine wherein alkyl is $C_1$–$C_{30}$ hydrocarbon, amino ethyl ethanol amine, dimethylaminopropylamine, aminopropyl morpholine, 3,3'-iminobis(N,N-dimethylpropylamine), and aminoethyl piperarline.

11. The compound of claim 10, wherein A is the alkyl etheramine, wherein the alkyl is $C_1$–$C_{30}$ hydrocarbon.

12. The compound of claim 11, wherein the alkyl etheramine is $NH_2(CH_2)_3NH(CH_2)_3OR^9$, wherein $R^9$ is alkyl having from 1 to 30 carbon atoms.

13. The compound of claim 1, which is at least one compound selected from the group consisting of:

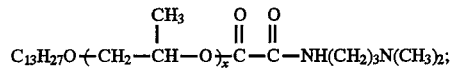

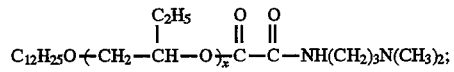

-continued and

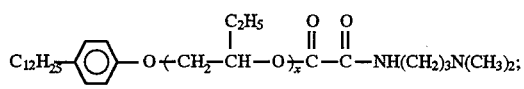

wherein x is an integer from 5 to 30.

14. The compound of claim 1, which is at least one compound selected from the group consisting of:

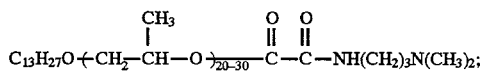

and

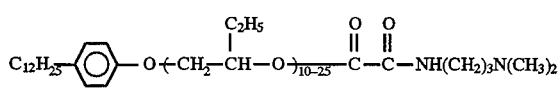

15. A distillate fuel composition comprising a mixture of a major amount of a distillate fuel and at least one compound according to claim 1.

16. The distillate fuel composition of claim 15, wherein the distillate fuel is selected from the group consisting of gasoline, diesel fuels, kerosenes, jet fuels, burner fuels, home heating oils and gas oils.

17. A distillate fuel composition comprising a mixture of a major amount of a gasoline and at least one compound according to claim 3.

18. A distillate fuel composition comprising a mixture of a major amount of a gasoline and at least one compound according to claim 13.

19. The distillate fuel composition of claim 15, further comprising at least one diester of Formula I(b):

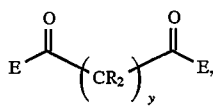  I(b)

wherein E, R, and y are defined as in Formula I.

20. The distillate fuel composition of claim 15, further comprising at least one poly(oxyalkylene)alcohol of Formula I(c):

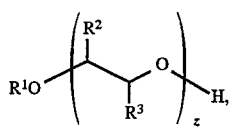  I(c)

wherein z is an integer from 5 to 40, and $R^1$, $R^2$, and $R^3$ are defined as in Formula I.

21. The distillate fuel composition of claim 20, wherein the alcohol of Formula I(c) is a copolymer comprising moieties wherein the sum of $R^2$ and $R^3$ is 3 and moieties wherein the sum of $R^2$ and $R^3$ is 4.

22. The distillate fuel composition of claim 20, wherein the fuel composition comprises a diester of Formula I(b):

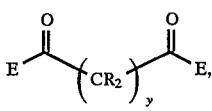  I(b)

wherein E, R and y are defined as in Formula I.

23. A lubricant composition comprising a mixture of a major amount of an oil of lubricating viscosity and at least one compound according to claim 1.

24. A lubricant composition comprising a mixture of a major amount of an oil of lubricating viscosity and at least one compound according to claim 3.

25. A lubricant composition comprising a mixture of a major amount of an oil of lubricating viscosity and at least one compound according to claim 13.

26. A method for the preparation of a compound of a Formula I:

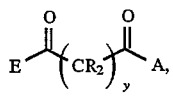  I wherein each R is independently selected from the group consisting of H and an alkyl having from 1 to 5 carbon atoms, y represents an integer from 0 to 5, and E represents a moiety of a Formula II:

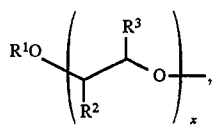  II wherein $R^2$ and $R^3$ are independently selected from the group consisting of H and alkyl, wherein $R^2$ and $R^3$ have a total of 0 to 10 carbon atoms, wherein optionally $R^2$ and $R^3$ bond to each other to form a cycloaliphatic ring having from 5 to 10 carbon atoms, x is an integer from 5 to 30, and $R^1$ is selected from the group consisting of H, alkyl having from 1 to 18 carbon atoms, and alkylaryl of Formula III:

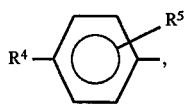  III wherein $R^4$ and $R^5$ are selected from the group consisting of H and $C_1$–$C_{60}$ alkyl, and A is a polyamine moiety having from 2 to 10 nitrogen atoms, wherein the polyamine moiety comprises at least one member of the group consisting of a primary amino group and a secondary amino group, comprising the steps of:

reacting a polyether with a di-carbonyl-containing reactant to form an intermediate product, wherein the polyether has the Formula V:

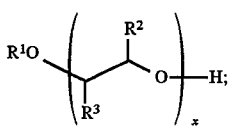  V and reacting the intermediate product with a polyamine compound to form the compound of Formula I, the polyamine compound has the Formula V(a):

A—H   V(a).

27. The method of claim 26, wherein the di-carbonyl-containing reactant has a Formula VI:

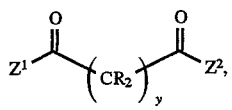

wherein each R is independently defined as in Formula I, $Z^1$ and $Z^2$ are independently selected from the group consisting of OH, Cl, Br, and $OR^6$, wherein $R^6$ is $C_{1-5}$ alkyl.

28. The method of claim 27, wherein the di-carbonyl-containing reactant is selected from the group consisting of oxalic acid, diethyl oxalate, and oxalyl dichloride and the intermediate product is a dipolyether diester.

29. The method of claim 28, wherein the di-carbonyl-containing reactant is selected from the group consisting of oxalic acid and diethyl oxalate, and at least about 2 equivalents of the polyether are provided for each equivalent of the oxalyl-containing reactant.

30. The method of claim 29, wherein the di-carbonyl-containing reactant and polyether are reacted at a temperature of about 100° to about 160° C. in the presence of an acid catalyst.

31. The method of claim 28, wherein the di-carbonyl-containing reactant is oxalyl dichloride and at least about 2 equivalents of the polyether are provided for each equivalent of the oxalyl dichloride.

32. The method of claim 31, wherein the oxalyl dichloride and polyether of Formula V are reacted at a temperature of about 100° to about 160° C. in the presence of a nitrogen atmosphere.

33. The method of claim 24, wherein the reactions occur in the presence of at least one organic solvent.

34. The method of claim 28, wherein at least about 1 equivalent of the dipolyether diester is provided for each equivalent of the polyamine, and the dipolyether diester and the polyamine are reacted with each other at a temperature of about 0° to about 160° C. in the presence of an organic solvent.

35. The method of claim 27, wherein the di-carbonyl-containing reactant is selected from at least one member of the group consisting of oxalyl dichloride and ethyloxalyl chloride, and at least about 1 equivalent of the polyether is mixed with each equivalent of the di-carbonyl-containing reactant to form a mixture which is maintained at a temperature of about 0° to about 10° C. to produce a monoester compound of Formula VIII:

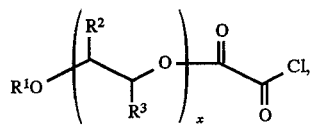

as the intermediate product, wherein $R^1$, $R^2$, $R^3$ and x are defined as in Formula I.

36. The method of claim 35, wherein the compound of Formula VIII is reacted with the polyamine compound of Formula V(a) at a temperature of about 0° to about 10° C.

37. A method for the preparation of a compound of a Formula I:

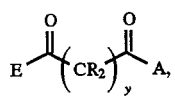

wherein each R is independently selected from the group consisting of H and an alkyl having from 1 to 5 carbon atoms, y is an integer from 0 to 5, and E represents a moiety of a Formula II

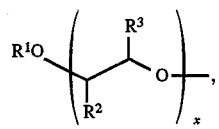

wherein $R^2$ and $R^3$ are independently selected from the group consisting of H and alkyl, wherein $R^2$ and $R^3$ have a total of 1 to 10 carbon atoms, x is an integer from 5 to 30, and $R^1$ is selected from the group consisting of H, alkyl having from 1 to 18 carbon atoms, and alkylaryl of Formula III:

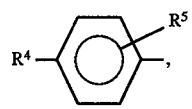

wherein $R^4$ and $R^5$ are selected from the group consisting of H and $C_1-C_{60}$ alkyl, and A is a polyamine moiety having from 2 to 10 nitrogen atoms, wherein the polyamine moiety comprises at least one member of the group consisting of a primary amino group and a secondary amino group, comprising the steps of:

reacting a polyamine of Formula V(a):

$$A-H \qquad \qquad V(a),$$

and a dicarbonyl-containing reactant having a Formula VI:

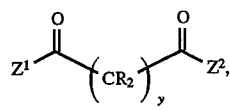

wherein $Z^1$ is $OR^6$, wherein $R^6$ is $C_{1-5}$ alkyl and $Z^2$ is selected from the group consisting of Cl or Br, at a temperature of about 0° to about 160° C., in the presence of an organic solvent, to form a compound of Formula X:

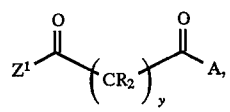

and reacting the compound of Formula X with a polyether compound of Formula V:

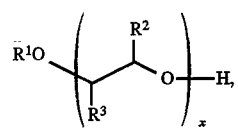

at a temperature of about 110° C. to about 160° C. and in the presence of a basic catalyst.

38. A method of operating an internal combustion engine, comprising burning a distillate fuel which contains from about 100 ppm to about 2 weight percent of a compound according to claim 1.

39. A method of reducing the formation of intake valve deposits in an internal combustion engine which burns a distillate fuel, comprising operating the engine with a distillate fuel composition containing a mixture of a distillate fuel and a compound according to claim 1 in an amount at least sufficient to reduce intake valve deposit formation.

40. A method of reducing the formation of intake valve deposits in an internal combustion engine which burns a distillate fuel, comprising operating the engine with a distillate fuel composition containing a mixture of a distillate fuel and a compound according to claim 3 in an amount at least sufficient to reduce intake valve deposit formation, wherein the distillate fuel is gasoline.

41. A method of reducing the formation of intake valve deposits in an internal combustion engine which burns a distillate fuel, comprising operating the engine with a distillate fuel composition containing a mixture of a distillate fuel and a compound according to claim 13 in an amount at least sufficient to reduce intake valve deposit formation, wherein the distillate fuel is gasoline.

42. The method of claim 39, wherein the amount of the compound is at least sufficient to control combustion chamber deposit formation.

43. The method of claim 39, wherein the amount of the compound is at least sufficient to reduce octane requirement increase.

44. A method of dispersing deposits in an internal combustion engine lubricated by an oil of lubricating viscosity, comprising operating the engine with a lubricant comprising a mixture of a major portion of the oil of lubricating viscosity and a compound according to claim 1.

45. An additive pack composition comprising a mixture of from 0.1 to 99.99% by weight of at least one compound of claim 1 and a minor amount of at least one ingredient from the group consisting of an inert solvent and a carrier fluid.

46. The additive pack composition of claim 45, wherein the ingredient is selected from at least one member of the group consisting of a mineral oil, a poly-alpha-olefin oligomer, a polyoxyalkylene glycol, and a carboxylic acid ester.

47. A salt complex made by reacting a compound of claim 1, with at least one reactive metal ion species selected from the group consisting of nitrates, thiocyanates, halides, carboxylates, phosphates, thiophosphates, sulfates and borates of at least one transition metal.

48. A salt complex made by boronating a compound of claim 1.

49. A lubricant composition comprising a mixture of a major amount of an oil of lubricating viscosity and at least one salt complex of claim 47.

50. A lubricant composition comprising a mixture of a major amount of an oil of lubricating viscosity and at least one salt complex of claim 48.

51. An additive pack composition comprising an inert solvent and from 0.1 to 99.99% by weight of at least one salt complex of claim 47.

52. An additive pack composition comprising an inert solvent and from 0.1 to 99.99% by weight of at least one salt complex of claim 48.

\* \* \* \* \*